United States Patent
Naylor et al.

(10) Patent No.: US 12,287,763 B2
(45) Date of Patent: Apr. 29, 2025

(54) METHODS FOR FACILITATING EXTERNAL CACHE IN A CLOUD STORAGE ENVIRONMENT AND DEVICES THEREOF

(71) Applicant: NetApp, Inc., Sunnyvale, CA (US)

(72) Inventors: Brian Naylor, Raleigh, NC (US); Rajesh Rajaraman, Acton, MA (US)

(73) Assignee: NETAPP, INC., San Jose, CA (US)

( * ) Notice: Subject to any disclaimer, the term of this patent is extended or adjusted under 35 U.S.C. 154(b) by 414 days.

(21) Appl. No.: 15/167,939

(22) Filed: May 27, 2016

(65) Prior Publication Data

US 2017/0344575 A1   Nov. 30, 2017

(51) Int. Cl.
*G06F 16/172*   (2019.01)
*G06F 12/0804*   (2016.01)
(Continued)

(52) U.S. Cl.
CPC ........ *G06F 16/172* (2019.01); *G06F 12/0804* (2013.01); *G06F 12/0813* (2013.01);
(Continued)

(58) Field of Classification Search
CPC ............ G06F 17/30132; G06F 17/302; G06F 12/0813; G06F 12/0891; G06F 12/0804;
(Continued)

(56) References Cited

U.S. PATENT DOCUMENTS

| | | | |
|---|---|---|---|
| 7,424,577 B2 * | 9/2008 | Bali | G06F 12/128 |
| | | | 711/134 |
| 7,430,639 B1 * | 9/2008 | Bali | G06F 12/0897 |
| | | | 711/134 |

(Continued)

FOREIGN PATENT DOCUMENTS

| | | | | |
|---|---|---|---|---|
| AU | 2010350748 A1 | * | 11/2012 | G06F 16/90 |
| CN | 101369463 A | * | 2/2009 | |

(Continued)

OTHER PUBLICATIONS

European Search Report and Written Opinion of Corresponding European Patent Application No. PCT/US2017/033791, 10 pages, dated Aug. 21, 2017.

(Continued)

*Primary Examiner* — Neveen Abel Jalil
*Assistant Examiner* — Hubert Cheung
(74) *Attorney, Agent, or Firm* — TROUTMAN PEPPER LOCKE LLP

(57) ABSTRACT

A method, non-transitory computer readable medium and storage server computing device that stores an identifier for a file system block evicted from a buffer cache in an entry in a table. The file system block is inserted into a victim cache hosted by an ephemeral block-level storage device by invoking a function provided by an application programming interface (API). The API exposes the ephemeral block-level storage device to a virtual storage appliance via an operating system of the storage server computing device. The entry in the table is updated to include location(s) on the ephemeral block-level storage device at which one or more portions of the file system block are stored, the location(s) returned in response to the function invocation. By this technology, performance of the virtual storage appliance is significantly improved, resulting in lower latency for client devices requesting data in a cloud storage environment.

17 Claims, 5 Drawing Sheets

(51) Int. Cl.
  *G06F 12/0813*    (2016.01)
  *G06F 12/0868*    (2016.01)
  *G06F 12/0891*    (2016.01)
  *G06F 12/0897*    (2016.01)
  *G06F 12/128*     (2016.01)
  *G06F 16/182*     (2019.01)
  *H04L 67/01*      (2022.01)
  *H04L 67/1097*    (2022.01)

(52) U.S. Cl.
  CPC ...... *G06F 12/0868* (2013.01); *G06F 12/0891* (2013.01); *G06F 12/0897* (2013.01); *G06F 12/128* (2013.01); *G06F 16/1827* (2019.01); *H04L 67/01* (2022.05); *H04L 67/1097* (2013.01); *G06F 2212/263* (2013.01); *G06F 2212/314* (2013.01); *G06F 2212/60* (2013.01)

(58) Field of Classification Search
  CPC ............ G06F 12/0868; G06F 12/0897; G06F 12/128; G06F 2212/60; G06F 2212/263; G06F 2212/314; G06F 16/172; G06F 16/1827; H04L 67/42; H04L 67/1097; H04L 67/01
  See application file for complete search history.

(56) References Cited

U.S. PATENT DOCUMENTS

| | | | | |
|---|---|---|---|---|
| 7,752,395 | B1* | 7/2010 | Fair | G06F 12/0866 711/135 |
| 8,396,992 | B2* | 3/2013 | Lee | G06F 3/00 710/5 |
| 8,516,023 | B1* | 8/2013 | Cherukuri | G06F 17/30165 707/831 |
| 8,874,850 | B1* | 10/2014 | Goodson | G06F 12/0875 711/133 |
| 8,954,959 | B2* | 2/2015 | Tsirkin | G06F 9/45558 718/1 |
| 9,274,956 | B1* | 3/2016 | Salyers | G06F 12/0808 |
| 9,880,744 | B1* | 1/2018 | Dalal | G06F 3/0688 |
| 9,965,378 | B1* | 5/2018 | Weiner | G06F 11/3684 |
| 9,990,190 | B1* | 6/2018 | Burriss | G06F 21/53 |
| 10,037,427 | B1* | 7/2018 | Krivenok | G06F 9/5077 |
| 10,073,656 | B2* | 9/2018 | Zhe Yang | G06F 3/0665 |
| 2005/0057973 | A1* | 3/2005 | Khatami | G11C 16/20 365/185.33 |
| 2007/0050548 | A1* | 3/2007 | Bali | G06F 12/0804 711/E12.04 |
| 2007/0283015 | A1* | 12/2007 | Jackson | H04L 45/02 709/226 |
| 2008/0065827 | A1* | 3/2008 | Byrne | G06F 11/1076 714/E11.034 |
| 2008/0147992 | A1* | 6/2008 | Raikin | G06F 12/0833 711/146 |
| 2010/0153620 | A1* | 6/2010 | McKean | G06F 11/1466 711/103 |
| 2010/0217952 | A1* | 8/2010 | Iyer | G06F 12/0897 711/E12.078 |
| 2012/0216052 | A1* | 8/2012 | Dunn | G06F 21/78 713/193 |
| 2012/0297118 | A1* | 11/2012 | Gorobets | G06F 3/0679 711/E12.008 |
| 2013/0254457 | A1* | 9/2013 | Mukker | G06F 11/1441 711/103 |
| 2014/0040286 | A1* | 2/2014 | Bane | G06F 7/24 707/754 |
| 2014/0208001 | A1* | 7/2014 | Liu | G06F 11/1471 711/103 |
| 2014/0223096 | A1* | 8/2014 | Zhe Yang | G06F 12/0871 711/114 |
| 2014/0351809 | A1* | 11/2014 | Chawla | G06F 3/0665 718/1 |
| 2015/0012671 | A1* | 1/2015 | Park | G11C 16/00 710/5 |
| 2015/0012690 | A1* | 1/2015 | Bruce | G06F 12/0844 711/103 |
| 2015/0089121 | A1* | 3/2015 | Coudhury | G06F 12/0804 711/103 |
| 2015/0286438 | A1* | 10/2015 | Simionescu | G06F 12/0888 711/103 |
| 2016/0011929 | A1* | 1/2016 | Caradonna | G06F 3/067 714/6.2 |
| 2016/0042090 | A1* | 2/2016 | Mitkar | G06F 11/1448 707/649 |
| 2016/0110136 | A1* | 4/2016 | Saxena | G06F 3/0688 711/154 |
| 2016/0266797 | A1* | 9/2016 | Nagaraj | G06F 3/061 |
| 2016/0269501 | A1* | 9/2016 | Usgaonkar | H04L 67/568 |
| 2016/0371225 | A1* | 12/2016 | Denz | H04L 67/1097 |
| 2017/0060753 | A1* | 3/2017 | Denz | G06F 12/0875 |
| 2017/0123685 | A1* | 5/2017 | Zuo | G06F 3/065 |
| 2017/0168724 | A1* | 6/2017 | Abhijeet | G06F 3/065 |
| 2017/0168736 | A1* | 6/2017 | Batra | G06F 9/45558 |
| 2017/0168957 | A1* | 6/2017 | Christidis | G06F 12/0811 |
| 2017/0199823 | A1* | 7/2017 | Hayes | G06F 12/0246 |
| 2017/0300426 | A1* | 10/2017 | Chai | G06F 12/126 |

FOREIGN PATENT DOCUMENTS

| | | | | |
|---|---|---|---|---|
| CN | 102625334 A | * | 8/2012 | ....... G06F 16/24575 |
| CN | 102981963 A | * | 3/2013 | |
| EP | 2234044 A2 | * | 9/2010 | ....... G06F 17/30076 |
| TW | 1338485 B | * | 3/2011 | |
| WO | WO2016095233 A1 | * | 6/2016 | |

OTHER PUBLICATIONS

International Preliminary Report on Patentability for Application No. PCT/US2017/033791 mailed on Dec. 6, 2018, 7 pages.

* cited by examiner

METHODS FOR FACILITATING EXTERNAL CACHE IN A CLOUD STORAGE ENVIRONMENT AND DEVICES THEREOF

FIELD

This technology relates to data storage networks, and more particularly to methods and devices for facilitating external cache in cloud storage environments.

BACKGROUND

In many storage networks, storage server computing devices share a pool of data storage devices that may be hosted by a shelf or other enclosure. In a cloud environment, storage server computing devices host virtual storage appliances that carry out functions relating to management of the storage network and the data stored on the data storage devices.

Storage server computing devices may include a buffer cache that is an in-memory cache used by the virtual storage appliances to store data that is read from the data storage devices. Recently read data has an increased likelihood of being accessed again. Accordingly, in a subsequent access, the data in the buffer cache can be served from local, high performance, low latency storage. Therefore, the buffer cache allows a requesting client device to obtain the data faster, thereby improving overall performance of the virtual storage appliance.

Cloud storage providers generally monetize the hosting of data by monitoring the amount of data exchanged between the storage server computing devices and the data storage devices of the storage pool. Since servicing the subsequent access of data previously stored in a buffer cache does not require communication with a data storage device, costs also can be reduced using a buffer cache.

Although caching provides significant performance and cost advantages in storage networks, buffer caches are limited in size. Accordingly, buffer caches only provide a modest performance improvement for virtual storage appliances that otherwise are generally performance challenged.

DETAILED DESCRIPTION

Figure 1:
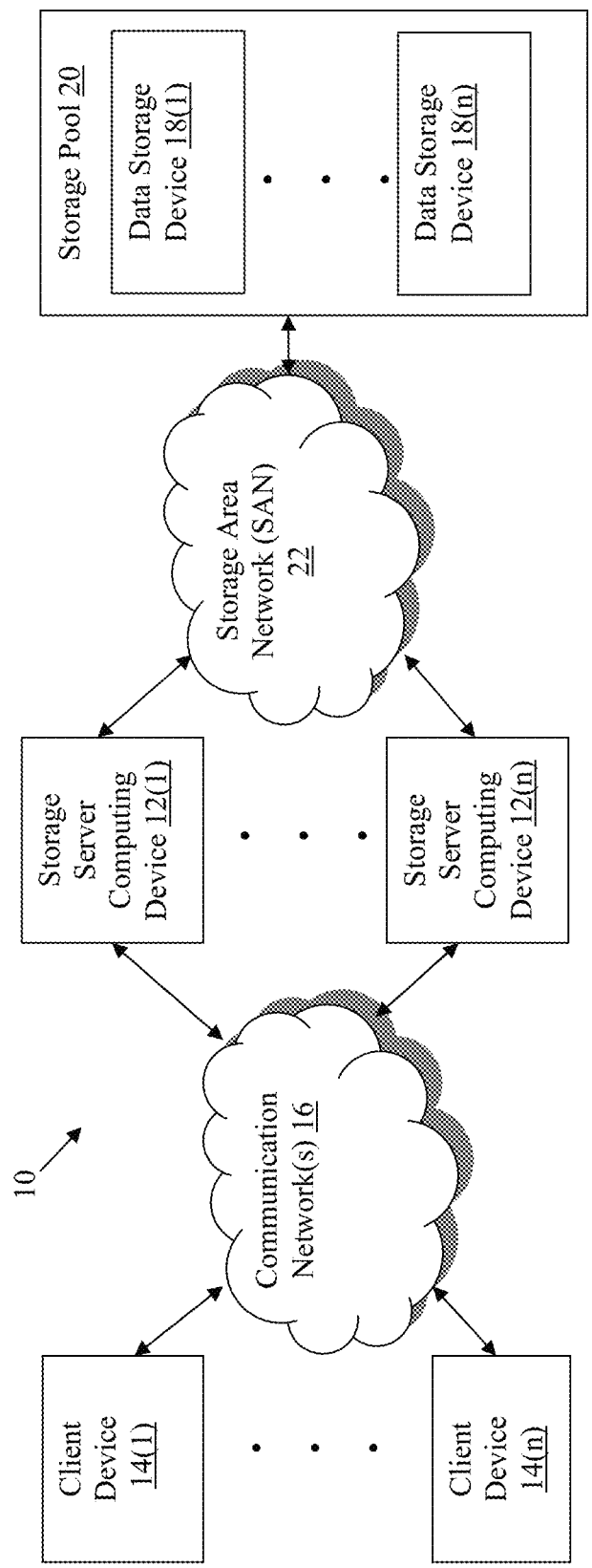
FIG. 1 is a block diagram of a network environment with exemplary storage server computing devices.

A cloud storage network environment 10 including exemplary storage server computing devices 12(1)-12(n) is illustrated in FIG. 1. The storage server computing devices 12(1)-12(2) in this example are coupled to client devices 14(1)-14(n) via communication network(s) 16 and data storage devices 18(1)-18(n) in a storage pool 20 via another communication network referred to in FIG. 1 as a storage area network (SAN) 22, although this network environment 10 can include other numbers and types of systems, devices, components, and/or elements in other configurations. Additionally, the network environment 10 may include other network devices such as one or more routers and/or switches, for example, which are well known in the art and thus will not be described herein. This technology provides a number of advantages including methods, non-transitory computer readable media, and devices that facilitated utilization of an ephemeral storage device as a victim cache to improve virtual storage appliance performance in a cloud environment.

Figure 2:
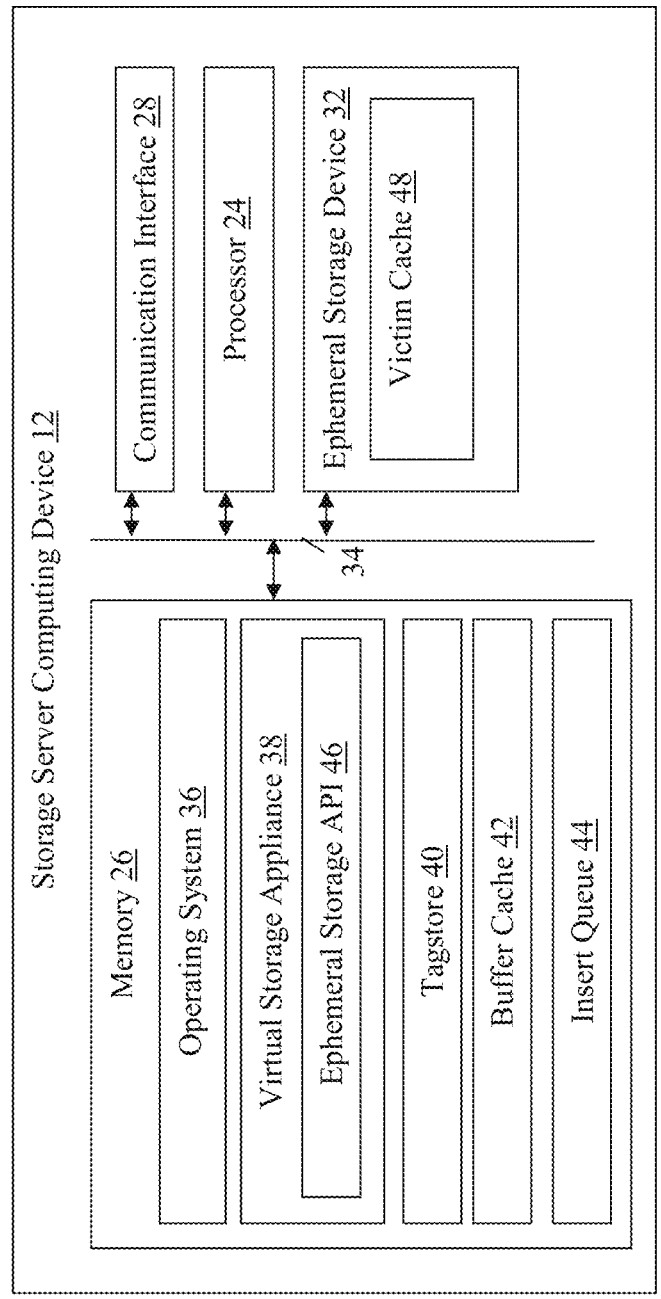
FIG. 2 is a block diagram of one of the exemplary storage server computing devices shown in FIG. 1.

Referring to FIG. 2, a block diagram of one of the exemplary storage server computing devices 12(1)-12(n) is illustrated. The storage server computing device 12 generally provides file services relating to the organization of information on the data storage devices 18(1)-18(n) on behalf of the client devices 14(1)-14(n). In this example, the storage server computing device 12 includes processor(s) 24, a memory 26, a communication interface 28, and an ephemeral storage device 32, which are coupled together by a bus 34 or other communication link.

The processor(s) 24 of the storage server computing device 12 may execute a program of stored instructions for one or more aspects of the this technology, as described and illustrated by way of the embodiments herein, although the processor(s) 24 could execute other numbers and types of programmed instructions. The processor(s) 24 in the storage server computing device 12 may include one or more central processing units (CPUs) or general purpose processors with one or more processing cores, for example.

The memory 26 of the storage server computing device 12 may include any of various forms of read only memory (ROM), random access memory (RAM), flash memory, non-volatile or volatile memory, or the like, or a combination of such devices, for example. In this example, the memory 26 includes an operating system 36, a virtual storage appliance 38, a table or tagstore 40, a buffer cache 42, and an insert queue 44, although other types and/or numbers of applications or modules can also be included in other examples. In particular, a plurality of virtual storage appliances 38 having their own tagstores, buffer cache, insert queues, and victim cache instances on the ephemeral storage device 32 can be hosted by the storage server computing device 12 in other examples.

The operating system 36 can be a host operating system such as FreeBSD, for example, that can act effectively as a hypervisor for the virtual storage appliance 38, which is a kernel module in some examples. The virtual storage appliance 38 is configured to functionally organize stored data by invoking storage operations to facilitate file services. In particular, the virtual storage appliance 38 implements a file system to logically organize information as a hierarchical structure of directories and files on the data storage devices 18(1)-18(n). Accordingly, the virtual storage appliance 38 cooperates with the communication interface 28 to access information requested by the client devices 14(1)-14(n) and stored on the data storage devices 18(1)-18(n), among other functions.

In this example, the ephemeral storage device 32 is block-level flash memory that is local and accessible via the operating system 36. In some examples, the hardware of the storage server computing device 12, including the ephemeral storage device 32 can be provided by a different entity than a provider of the virtual storage appliance 38. With this technology, the virtual storage appliance 38 is advantageously configured to leverage the ephemeral storage device 32 by utilizing the ephemeral storage application programming interface (API) 46.

In particular, the virtual storage appliance 38 utilizes the ephemeral storage device 32 to host a victim cache 48, which stores buffers that are evicted from the buffer cache. Accordingly, the victim cache 48 effectively acts as an additional cache level, which facilitates improved performance of the virtual storage appliance 38, as described and illustrated in more detail later. In this example, the ephemeral storage API 46 provides discover, read, and write functions that exposes the block-level ephemeral storage device 32 to the virtual storage appliance 38 hosted by the storage server computing device 12 via the operating system 36, also as described and illustrated in more detail later.

The tagstore 40 in this example stores information regarding file system blocks of data including whether the file system blocks are stored in the buffer cache 42 or in the victim cache 48. Serving data from the buffer cache 42 or victim cache 48 is quicker than serving the data from one of the data storage devices 18(1)-18(n) and advantageously does not incur a cost in many cloud storage networks. Accordingly, the tagstore 40 includes identifying information (e.g., a physical volume block number (PVBN)) and the location one or more corresponding file system blocks in the buffer cache 42 or one or more corresponding data and/or context blocks in the victim cache 48, as described and illustrated in more detail later.

The buffer cache 42 in this example is a repository for cached reads and writes associated with file system blocks of the data storage device(s) 18(1)-18(n) that are maintained in the form of buffers that can be used to service future reads to file system blocks more efficiently. Optionally, the buffer cache 42 is stored in RAM memory that is faster than the medium (e.g., flash) of the ephemeral storage device 32. Both the buffer cache 42 and the ephemeral storage device 32 are faster than the data storage devices 18(1)-18(n) (e.g., disks).

The optional insert queue 44 is used by the virtual storage appliance 38 to store buffers evicted from the buffer cache 42 that have been identified as qualifying for insertion into the victim cache 48. The buffers evicted from the buffer cache 42 can be queued in the insert queue 44 and more efficiently stored, by the virtual storage appliance 38 using the ephemeral storage API, in the victim cache 48 as a batch, although evicted buffers can also be inserted directly into the victim cache 48 in other examples.

The communication interface 28 of the storage server computing device 12 can include one or more network interface controllers (NICs) for operatively coupling and communicating between the storage server computing device 12 and the client devices 14(1)-14(n), which are coupled together by the communication network(s) 16, and the data storage devices 18(1)-18(n), which are coupled together by the SAN 22, although other types and numbers of communication networks or systems with other types and numbers of connections and configurations to other devices and elements also can be used.

By way of example only, the communication network(s) 16 and/or SAN 22 can use TCP/IP over Ethernet and industry-standard protocols, including NFS, CIFS, SOAP, XML, LDAP, and SNMP, although other types and numbers of communication networks, can be used. The communication network(s) 16 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The communication network(s) 16 may also comprise any local area network and/or wide area network (e.g., Internet), although any other type of traffic network topologies may be used. The SAN 22 can also utilize a conventional high-performance, Fibre Channel serial link topology, SAS, SCSI, or SATA, in other examples.

Referring back to FIG. 1, each of the client devices 14(1)-14(n) in this example includes a processor, a memory, a communication interface, and optionally an input device, and a display device, which are coupled together by a bus or other link, although each of the client devices 14(1)-14(n) can have other types and numbers of components or other elements and other numbers and types of network devices could be used.

The client devices 14(1)-14(n) may run interface applications that provide an interface to make requests for and send content and/or data to the storage server computing device 12 via the communication network(s) 16, for example. Each of the client devices 14(1)-14(n) may be a conventional personal computer, a tablet computing device, a smart phone, a virtual machine running in a cloud, an application server hosting applications that utilize backend storage, or other processing and/or computing device, for example.

The data storage devices 18(1)-18(n) can be hard disk drives, optical disk-based storage, or any other type of stable, non-volatile storage suitable for storing files or objects in storage volumes for short or long term retention, for example. The data storage devices 18(1)-18(n) optionally host one or more volumes based on a Redundant Array of Inexpensive Disks (RAID) architecture or other topology facilitating data persistency, although other types and numbers of volumes in other topologies can also be used.

Although examples of the storage server computing devices 12(1)-12(n), client devices 14(1)-14(n), and data storage devices 18(1)-18(n), are described and illustrated herein, it is to be understood that the devices and systems of the examples described herein are for exemplary purposes, as many variations of the specific hardware and software used to implement the examples are possible, as will be appreciated by those skilled in the relevant art(s). In addition, two or more computing systems or devices can be substituted for any one of the systems in any embodiment of the examples.

The examples also may be embodied as one or more non-transitory computer readable media having instructions stored thereon for one or more aspects of the present technology, as described and illustrated by way of the examples herein, which when executed by the processor, cause the processor to carry out the steps necessary to implement the methods of this technology, as described and illustrated with the examples herein.

Figure 3:
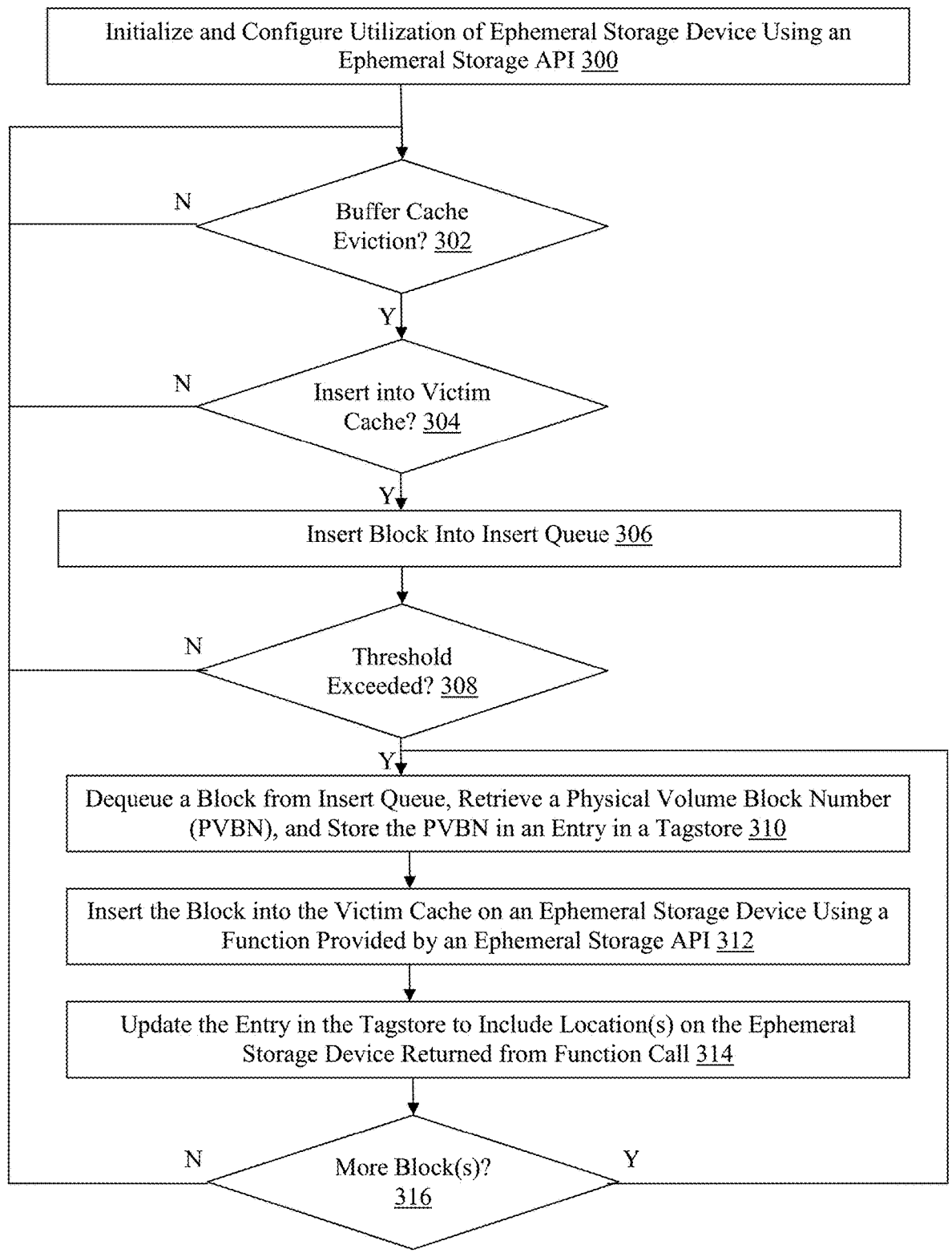
FIG. 3 is a flowchart of an exemplary method for populating a victim cache stored in an ephemeral storage device by a virtual storage appliance hosted by one of the exemplary storage server computing devices shown in FIG. 1.

An exemplary method for facilitating external cache in a cloud storage environment will now be described with reference to FIGS. 1-5. Referring more specifically to FIG. 3, a flowchart of an exemplary method for populating the victim cache 48 stored in the ephemeral storage device 22 by the virtual storage appliance 38 hosted by one of the exemplary storage server computing devices 12(1)-12(n) is illustrated. In step 300 in this particular example, the virtual storage appliance 38 hosted by the one of the storage server computing devices 12(1)-12(n) initializes and configures utilization of the ephemeral storage device 32 using the ephemeral storage API 46.

The ephemeral storage API 36 exposes the block-level ephemeral storage device 32 to the virtual storage appliance 38 via the operating system 36. Additionally, the ephemeral storage device 32 is a local storage medium that is accessible via the operating system 36. Further, the ephemeral storage device 32 is a non-persistent medium that cannot be incorporated into an aggregate maintained by the data storage devices 18(1)-18(n). In the event of a failure, the virtual storage appliance 38 may be rebooted on a different one of the storage server computing devices 12(1)-12(n). Since the ephemeral storage device 32 is a local storage medium, the virtual storage appliance 38 would no longer have access to that data stored in the ephemeral storage device 32 in such a scenario.

Accordingly, the ephemeral storage device 32 is ideally suited for use as an external cache in which corresponding data is persistently stored on the data storage devices 18(1)-18(n). In this particular example, the ephemeral storage device 32 is used to store the victim cache 48. The ephemeral storage API 46 provides a discover function that can be invoked by the virtual storage appliance 38. The discover function is configured to use the operating system 36 to determine whether the ephemeral storage device 32 is present on the storage server computing device 12. The discover function also configures the ephemeral storage device 32 for utilization as the victim cache 48 for the virtual storage appliances 38, when the ephemeral storage device 32 is determined to be present.

In step 302, the virtual storage appliance 38 hosted by the one of the storage server computing devices 12(1)-12(n) determines whether a buffer has been evicted from the buffer cache 42. Accordingly, subsequent to initialization, the virtual storage appliance services various read and write requests received from the client devices 14(1)-14(n) relating to data maintained by the data storage devices 18(1)-18(n). Read data can be maintained in the buffer cache 42 to facilitate relatively quick responses for subsequent requests for the data. In this example, the buffer cache 42 eventually reaches capacity and a buffer is evicted based on the application of a policy (e.g., an age-based policy).

Accordingly, if the virtual storage appliance 38 determines that there has not been an eviction from the buffer cache 42, then the No branch is taken back to step 302 and the virtual storage appliance effectively waits for a buffer to be evicted from the buffer cache 42 in this example. However, if the virtual storage appliance 38 determines that there has been an eviction from the buffer cache 42, then the Yes branch is taken to step 304.

In step 304, the virtual storage appliance 38 hosted by the one of the storage server computing devices 12(1)-12(n) determines whether the file system block associated with the evicted buffer should be inserted into the victim cache 48. The determination in step 304 can be based on the application of an established policy that prioritizes certain buffers over others for insertion in the victim cache 48. Accordingly, the policy can be based on hit count, type of data in the file system block, or likelihood of a future access by one of the client devices 14(1)-14(n), for example, although any other criteria can also be used to determine whether to insert an evicted buffer into the victim cache 48.

If the virtual storage appliance 38 determines that the file system block associated with the evicted buffer should not be inserted into the victim cache 48, then the No branch is taken back to step 302. Subsequent requests for the file system block will then be directed to one of the data storage devices 18(1)-18(n) as the file system block will no longer be cached. However, if the virtual storage appliance 38 determines that the file system block associated with the evicted buffer should be inserted into the victim cache 48, then the Yes branch is taken to step 306.

In step 306, the virtual storage appliance 38 hosted by the one of the storage server computing devices 12(1)-12(n) optionally inserts the file system block into the insert queue 44 in this example. The insert queue 44 can be used to batch file system block insertions into the victim cache 48 for efficiency purposes, although file system blocks can also be inserted directly into the victim cache 48 without being batched as well.

In step 308, the virtual storage appliance 38 hosted by the one of the storage server computing devices 12(1)-12(n) determines whether a threshold capacity has been exceeded in the insert queue 44. If the virtual storage appliance 38 determines that the threshold capacity has not been exceeded, then the No branch is taken back to step 302. However, if the virtual storage appliance 38 determines that the threshold capacity has been exceeded, then the Yes branch is taken to step 310.

In step 310, the virtual storage appliance 38 hosted by the one of the storage server computing devices 12(1)-12(n) dequeues a file system block from the insert queue 44, retrieves an identifier (e.g., PVBN) (e.g., from metadata of the file system block), and stores the identifier in an entry in the tagstore 40. The entry can be identified based on the application of a hash algorithm, for example, although any other type of method for determining locations for insertions into the tagstore 40 can also be used.

In step 312, the virtual storage appliance 38 hosted by the one of the storage server computing devices 12(1)-12(n) inserts the file system block into the victim cache 48 using the ephemeral storage API 46. The ephemeral storage API 46 in this example includes a write function that can be invoked by the virtual storage appliance 38. The write function is configured to use the operating system 36 to store the file system block in the victim cache 48 and return the location(s) in the victim cache 48 that were used to store the file system block.

Figure 4:
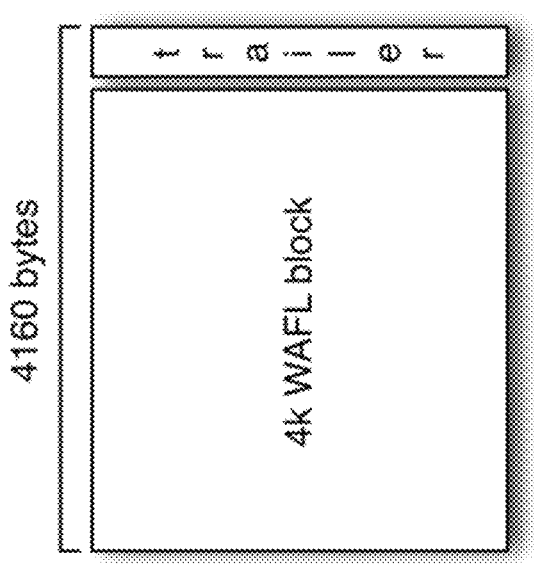
FIG. 4 is a block diagram illustrating storage of file system blocks that include metadata on an ephemeral storage device.
Figure 4:
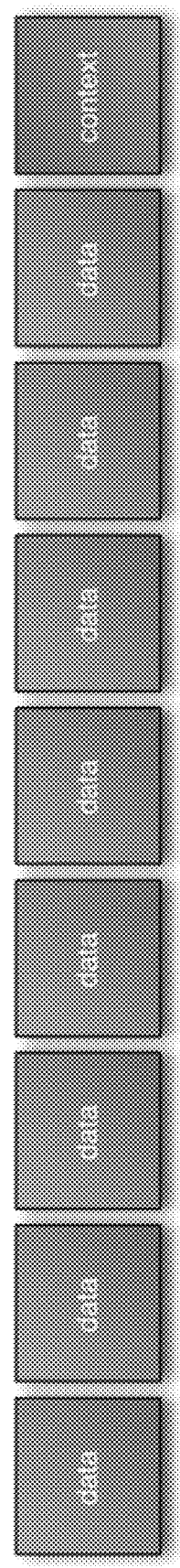

Referring more specifically to FIG. 4, a block diagram illustrating storage of file system blocks that include metadata on the ephemeral storage device 32 is illustrated. In this example, the file system block is larger than four kilobytes because it includes a trailer that includes 64 bytes of metadata regarding the file system block (e.g., used for error-checking purposes). The ephemeral storage device 32 hosting the victim cache 48 is a block-level storage device with that uses four kilobyte block sizes in this example. Additionally, the ephemeral storage device 32 in one particular example is an SSD with 512 byte sectors.

Accordingly, the write function of the ephemeral storage API 46 is configured to stripe the file system block across nine sectors wherein eight of the nine sectors are data blocks storing data of the file system block and one of the nine sectors is a context block storing metadata of the file system block. In this example, dedicating an entire block to the 64 byte context is advantageously avoided and the storage space on the ephemeral storage device 32 is more effectively utilized.

Referring back to FIG. 3, in step 314, the virtual storage appliance 38 hosted by the one of the storage server computing devices 12(1)-12(n) updates the entry in the tagstore 40 that is associated with the file system block corresponding to the buffer evicted from the buffer cache 42 to include location(s) on the ephemeral storage device 32. The locations on the ephemeral storage device 32 correspond to location in the victim cache 48 in which one or more of the data or context blocks associated with the file system block were stored in step 312. As indicated earlier, the write function of the ephemeral storage API 46 invoked by the virtual storage appliance 38 is configured to return the locations in response to the invocation.

In step 316, the virtual storage appliance 38 hosted by the one of the storage server computing devices 12(1)-12(n) determines whether there are more evicted buffers or corresponding file system blocks in the insert queue 44. If the virtual storage appliance 38 determines that there is at least one additional file system block to insert into the victim cache 48, then the Yes branch is taken back to step 310. However, if the virtual storage appliance 38 determines that the insert queue 44 is empty and that there are currently no more file system blocks to insert into the victim cache 48, then the No branch is taken back to step 302. One or more of steps 302-316 can occur in parallel in other examples.

Figure 5:
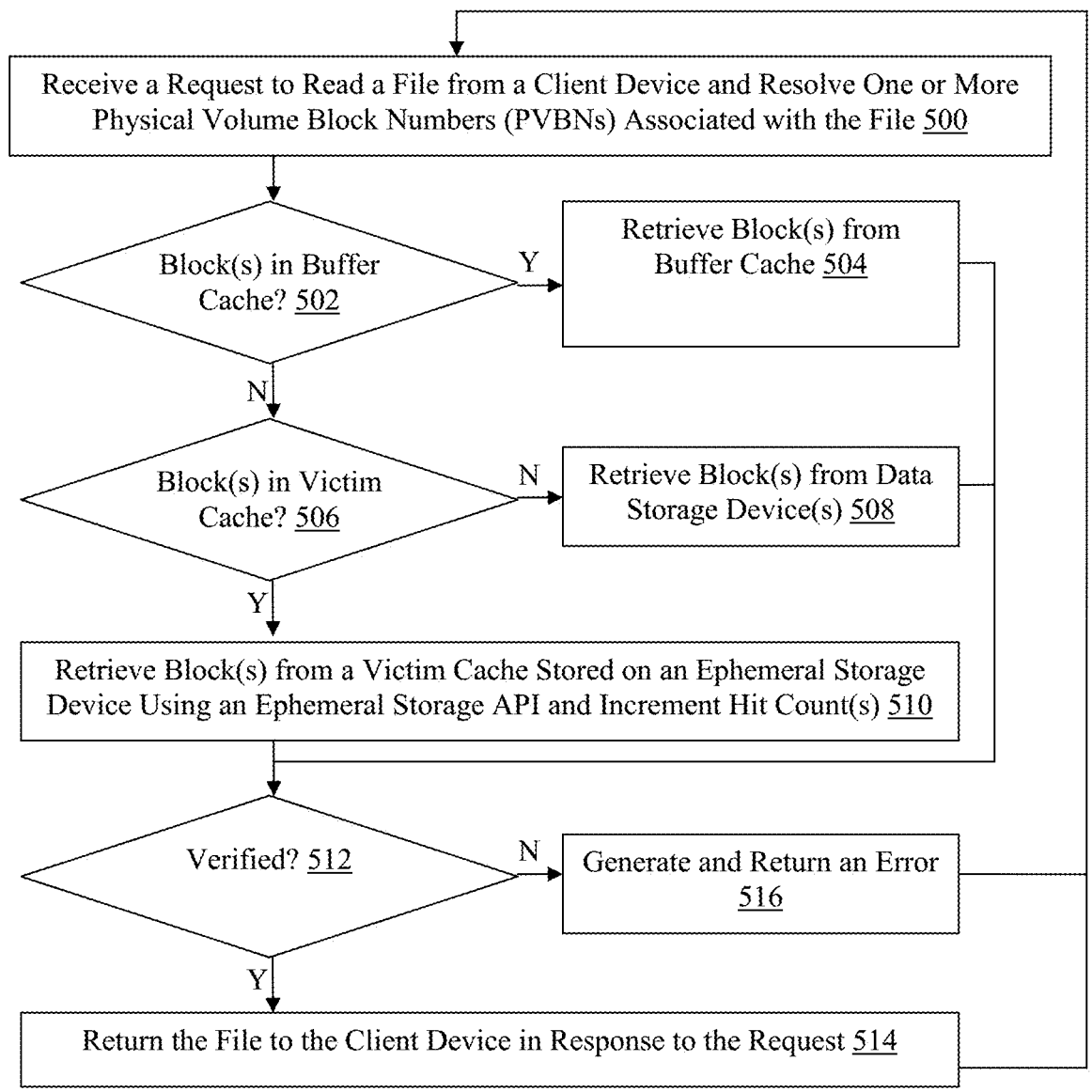
FIG. 5 is a flowchart of an exemplary method for processing read requests by a virtual storage appliance hosted by one of the exemplary storage server computing devices shown in FIG. 1 using an ephemeral storage device storing a victim cache.

Referring more specifically to FIG. 5, a flowchart of an exemplary method for processing read requests by the virtual storage appliance 38 hosted by one of the exemplary storage server computing devices 12(1)-12(n) using the ephemeral storage device 32 storing the victim cache 48 is illustrated. In step 500 in this particular example, the virtual storage appliance 38 hosted by the one of the storage server computing devices 12(1)-12(n) receives a request to read a file from one of the client devices 14(1)-14(n). The virtual storage appliance 38 also resolves one or more identifiers (e.g., one or more PVBNs) of file system blocks associated with the file. The read request can be received via the communication network(s) 16, for example.

In step 502, the virtual storage appliance 38 hosted by the one of the storage server computing devices 12(1)-12(n) determines whether the file system blocks are in the buffer cache 42. The determination can be made based on an indication or location in the entries in the tagstore 40 for the file system blocks, for example, although other methods of determining whether the file system blocks are stored in the buffer cache 42 can also be used. If the virtual storage appliance 38 determines that the file system blocks are stored in the buffer cache 42, then the Yes branch is taken to step 504.

In step 504, the virtual storage appliance 38 hosted by the one of the storage server computing devices 12(1)-12(n) retrieves the file system blocks from the buffer cache 42 using the locations in the corresponding entries in the tagstore 40 for the file system blocks. Since the file system blocks are retrieved from the local buffer cache 42 maintained in the memory 26, no charge is incurred for the virtual storage appliance 38 to obtain the file in this example. If back in step 502 the virtual storage appliance 38 that the file system blocks are not in the buffer cache, then the No branch is taken to step 506.

In step 506, the virtual storage appliance 38 hosted by the one of the storage server computing devices 12(1)-12(n) determines whether the file system blocks are in the victim cache 48. The determination can be made based on an indication or location in the entries in the tagstore 40 for the file system blocks, for example, although other methods of determining whether the file system blocks are stored in the victim cache 48 can also be used. Optionally, a hash function can be utilized to identify entries in the tagstore 40, for example. The tagstore 40 can be populated as described and illustrated in more detail earlier with reference to FIG. 3. If the virtual storage appliance 38 determines that the all of the file system blocks corresponding to the file are not stored in the victim cache 48, then the No branch is taken to step 508.

In step 508, the virtual storage appliance 38 hosted by the one of the storage server computing devices 12(1)-12(n) retrieves the file system blocks corresponding to the file from one or more of the data storage devices 18(1)-18(n). Accordingly, when the requested file is not cached, the virtual storage appliance 38 resolves the location of the file system blocks in the file system and uses the SAN 22 to obtain the file from one or more of the data storage devices 18(1)-18(n). An associated charge is incurred for the transfer of the file across the SAN 22. However, if the virtual storage appliance 38 determines in step 506 that all of the file system blocks corresponding to the file are stored in the victim cache 48, then the Yes branch is taken to step 510.

In step 510, the virtual storage appliance 38 hosted by the one of the storage server computing devices 12(1)-12(n) retrieves the file system blocks from the victim cache 48 on the ephemeral storage device 32 using the locations included in the entries in the tagstore 40 for the file system blocks and the ephemeral storage API 46. Since there was a hit in the tagstore 40 for all of the file system blocks corresponding to the file, and the file system blocks were not stored in the buffer cache 42, the file system blocks must be stored in the victim cache 48 in this example. Accordingly, the file system blocks were previously stored in the buffer cache 42, but were evicted due to storage constraints of the buffer cache 42 and subsequently inserted into the victim cache 48, as described and illustrated in more detail earlier with reference to FIG. 3.

The virtual storage appliance 38 in this example is configured to invoke a read function provided by the ephemeral storage API 46, optionally passing one or more of the locations of the file system blocks retrieved from the tagstore 40. The read function is then configured to use the operating system 36 to access the locations in the victim cache 48 in order to obtain the file system blocks corresponding to the file. For each requested file system block, the read function is configured to obtain multiple data blocks and one context block that were inserted into the victim cache 48 as described and illustrated in more detail later with reference to FIG. 3.

Optionally, the virtual storage appliance 38 also can increment a hit count in the entries of the tagstore 40 for each of the file system blocks to indicate that the file system blocks have been accessed by one of the client devices 14(1)-14(n). The hit count can be used to evaluate an eviction policy for the victim cache 48, although age-based and other eviction policies can also be used to manage the victim cache 48. Subsequent to retrieving the file system blocks from one or more of the data storage devices 18(1)-18(n) in step 504, the buffer cache 42 in step 508, or the victim cache 48 in step 510, the virtual storage appliance 38 proceeds to step 512.

In step 512, the virtual storage appliance 38 hosted by the one of the storage server computing devices 12(1)-12(n) determines whether the retrieved file system blocks are verified. With respect to file system blocks retrieved from the victim cache 48, a retrieved context block storing metadata can be used to verify that the data contained in corresponding data blocks, retrieved from the victim cache 48 for each of the file system blocks, is valid, although other methods for verifying the retrieved file system blocks can also be used. If the virtual storage appliance 38 determines that the retrieved file system blocks are verified, then the file is returned to the requesting one of the client devices 14(1)-14(n) via the communication network(s) 16.

However, if the virtual storage appliance 38 determines in step 512 that the file system blocks are not verified, then the No branch is taken to step 516. In step 516, the virtual storage appliance 38 hosted by the one of the storage server computing devices 12(1)-12(n) generates and returns an error to the requesting one of the client devices 14(1)-14(n), drops the request received in step 500, and/or initiates a mitigation action to determine or correct the error, for example. Optionally, one or more of steps 502-16 can be performed in parallel by the virtual storage appliances for any number of read requested received in step 500.

Accordingly, with this technology, virtual storage appliance performance in a cloud storage environment can be significant improved. In particular, an additional ephemeral storage device hosted by a storage server computing device provided by a cloud storage provider can be leveraged as an additional external cache level or victim cache. By increasing the available cache storage space, an increased number of storage operations received from client devices can be serviced with reduced latency. Moreover, cost can be reduced since data served from the local ephemeral storage device does not require traversing a SAN in order to communicate with data storage devices or disks.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method comprising:
   invoking, by a virtual storage appliance (VSA) executing on a computing device, a discover function of a VSA application programming interface (API) to thereby use an operating system of the computing device to discover whether a hardware flash storage device local to the computing device on which the VSA that invoked the discover function is executing is present on the computing device, wherein the operating system comprises a hypervisor for the VSA, the hardware flash storage device is coupled to memory hosting the operating system via a bus, and the discover function is configured to, when the hardware flash storage device is present on the computing device, expose the hardware flash storage device to the VSA via the operating system and configure the hardware flash storage device for utilization as a victim cache for the VSA;
   invoking, by the VSA, a write function provided by the VSA API to cause the operating system to insert a file system block evicted from a buffer cache in the memory into a victim cache hosted by the hardware flash storage device;
   updating, by the VSA, a data structure stored in the memory to associate a unique location on the hardware flash storage device, at which the file system block was stored by the operating system, with an identifier for the file system block, wherein the unique location is returned by the operating system to the VSA in response to the write function invocation by the VSA and the data structure stores identifiers and corresponding unique locations for a plurality of file system blocks stored in the buffer cache in the memory and in the victim cache hosted by the hardware flash storage device;
   determining, by the VSA, that the file system block is stored in the victim cache based on a match in the data structure of the identifier for the file system block resolved by the VSA based on an indication of a file in a read request;
   obtaining, by the VSA, from the data structure the unique location based on an association in the data structure of the unique location with the identifier that was resolved by the VSA based on the indication of the file in the read request;
   passing, by the VSA, the unique location to a read function provided by the VSA API to cause the operating system to obtain and return to the VSA the file system block from the hardware flash storage device based on the unique location; and
   servicing, by the VSA, the read request by returning the file system block in response to the read request, wherein the file system block was returned to the VSA by the operating system in response to the invocation of the read function, wherein the hardware flash storage device comprises an ephemeral storage device.

2. The method of claim 1, wherein the file system block comprises metadata and has a first size, the hardware flash storage device comprises sectors each having a second size, and the write function is configured to generate, based on the file system block, data blocks and a context block and to stripe the data blocks and the context block across a respective one of the sectors, wherein the data blocks and the context block each have the second size and the context block comprises the metadata.

3. The method of claim 1, further comprising retrieving, by the VSA, data blocks and a context block associated with the file system block from the victim cache by invoking the read function in response to the read request.

4. The method of claim 3, further comprising sending, by the VSA, the file system block to a client device in response to the read request, when the file system block is verified by the VSA based on metadata included in the context block.

5. The method of claim 1, further comprising inserting, by the VSA, the file system block into an insert queue when the VSA determines that the file system block should be inserted into the victim cache based on an application of an established policy.

6. A non-transitory machine readable medium having stored thereon instructions comprising machine executable code which when executed by a machine causes the machine to execute a virtual storage appliance (VSA) to:
   invoke a discover function of a VSA application programming interface (API) to thereby use an operating system of the machine to discover whether a hardware flash storage device local to the machine on which the VSA that invoked the discover function is executing is present on the machine, wherein the operating system comprises a hypervisor for the VSA, the hardware flash storage device is coupled to memory hosting the operating system via a bus, and the discover function is configured to, when the hardware flash storage device is present on the machine, expose the hardware flash storage device to the VSA via the operating system and configure the hardware flash storage device for utilization as a victim cache for the VSA;

invoke a write function provided by the VSA API to cause the operating system to insert a file system block evicted from a buffer cache in the memory into a victim cache hosted by the hardware flash storage device;

update a data structure stored in the memory to associate a unique location on the hardware flash storage device, at which the file system block was stored by the operating system, with an identifier for the file system block, wherein the unique location is returned by the operating system to the VSA in response to the write function invocation by the VSA and the data structure stores identifiers and corresponding unique locations for a plurality of file system blocks stored in the buffer cache in the memory and in the victim cache hosted by the hardware flash storage device;

determine that the file system block is stored in the victim cache based on a match in the data structure of the identifier for the file system block resolved by the VSA based on an indication of a file in a read request;

obtain from the data structure the unique location based on an association in the data structure of the unique location with the identifier that was resolved by the VSA based on the indication of the file in the read request;

pass the unique location to a read function provided by the VSA API to cause the operating system to obtain and return to the VSA the file system block from the hardware flash storage device based on the unique location; and service the read request by returning the file system block in response to the read request, wherein the file system block was returned to the VSA by the operating system in response to the invocation of the read function, wherein the hardware flash storage device comprises an ephemeral storage device.

7. The non-transitory machine readable medium of claim 6, wherein the file system block comprises metadata and has a first size, the hardware flash storage device comprises sectors each having a second size, and the write function is configured to generate, based on the file system block, data blocks and a context block and to stripe the data blocks and the context block across a respective one of the sectors, wherein the data blocks and the context block each have the second size and the context block comprises the metadata.

8. The non-transitory machine readable medium of claim 6, wherein the machine executable code when executed by the machine further causes the machine to execute the VSA to retrieve data blocks and a context block associated with the file system block from the victim cache by invoking the read function in response to the read request.

9. The non-transitory machine readable medium of claim 8, wherein the machine executable code when executed by the machine further causes the machine to execute the VSA to send the file system block to a client device in response to the read request, when the file system block is verified by the VSA based on metadata included in the context block.

10. The non-transitory machine readable medium of claim 6, wherein the machine executable code when executed by the machine further causes the machine to execute the VSA to insert the file system block into an insert queue when the VSA determines that the file system block should be inserted into the victim cache based on an application of an established policy.

11. A computing device, comprising:
a hardware flash storage device;
memory coupled to the hardware flash storage device via a bus, hosting an operating system, a buffer cache, and a data structure, and having stored thereon instructions comprising machine executable code; and one or more processors coupled to the memory via the bus and configured to execute the machine executable code to cause the one or more processors to execute a virtual storage appliance (VSA) to:

invoke a discover function of a VSA application programming interface (API) to thereby use the operating system of the computing device to discover that the hardware flash storage device is present on the computing device, wherein the operating system comprises a hypervisor for the VSA and the discover function is configured to expose the hardware flash storage device to the VSA via the operating system and configure the hardware flash storage device for utilization as a victim cache for the VSA;

invoke a write function provided by the VSA API to cause the operating system to insert a file system block evicted from the buffer cache into the victim cache;

update the data structure to associate a unique location on the hardware flash storage device, at which the file system block was stored by the operating system, with an identifier for the file system block, wherein the unique location is returned by the operating system to the VSA in response to the write function invocation by the VSA and the data structure stores identifiers and corresponding unique locations for a plurality of file system blocks stored in the buffer cache and the victim cache;

determine that the file system block is stored in the victim cache based on a match in the data structure of the identifier for the file system block resolved by the VSA based on an indication of a file in a read request;

obtain from the data structure the unique location based on an association in the data structure of the unique location with the identifier that was resolved by the VSA based on the indication of the file in the read request;

pass the unique location to a read function provided by the VSA API to cause the operating system to obtain and return to the VSA the file system block from the hardware flash storage device based on the unique location; and service the read request by returning the file system block in response to the read request, wherein the file system block was returned to the virtual storage appliance VSA by the operating system in response to the invocation of the read function, wherein the hardware flash storage device comprises an ephemeral storage device.

12. The computing device of claim 11, wherein the file system block comprises metadata and has a first size, the hardware flash storage device comprises sectors each having a second size, and the write function is configured to generate, based on the file system block, data blocks and a context block and to stripe the data blocks and the context block across a respective one of the sectors, wherein the data blocks and the context block each have the second size and the context block comprises the metadata.

13. The computing device of claim 11, wherein the one or more processors are further configured to execute the machine executable code to further cause the one or more processors to execute the VSA to retrieve data blocks and a context block associated with the file system block from the victim cache by invoking the read function in response to the read request.

14. The storage server computing device of claim 13, wherein the one or more processors are further configured to execute the machine executable code to further cause the one or more processors to execute the VSA to send the file system block to a client device in response to the read request, when the file system block is verified by the VSA based on metadata included in the context block.

15. The computing device of claim 11, wherein the one or more processors are further configured to execute the machine executable code to further cause the one or more processors to execute the VSA to insert the file system block into an insert queue when the VSA determines that the file system block should be inserted into the victim cache based on an application of an established policy.

16. The computing device of claim 11, further comprising a system bus, wherein the hardware flash storage device hosting the victim cache and the memory hosting the buffer cache are communicably coupled via the system bus.

17. The computing device of claim 11, wherein the memory further hosts an insert queue and the one or more processors are further configured to execute the machine executable code to further cause the one or more processors to execute the VSA to insert the file system block into the insert queue when the VSA determines that the file system block requires eviction from the buffer cache, wherein the file system block is inserted into the victim cache after a threshold capacity of the insert queue has been reached.

\* \* \* \* \*